United States Patent
Oh et al.

(10) Patent No.: US 7,268,949 B2
(45) Date of Patent: Sep. 11, 2007

(54) MICROLENS ARRAY SHEET AND MANUFACTURING METHOD THEREOF

(75) Inventors: Chang-Hoon Oh, Seoul (KR); Hyouk Kwon, Seoul (KR); Tae-Sun Lim, Suwon-si (KR); Young-Joo Yee, Seongnam-si (KR); Ki-Won Park, Anyang-si (KR); Dong-Mug Seong, Ansan-si (KR); Gun-Woo Lee, Daegu (KR)

(73) Assignees: LG Electronics Inc., Seoul (KR); LG Micron Ltd., Gyeonggsangbuk ( * ) Notice: Subject to any disclaimer, the term of this patent is extended or adjusted under 35 U.S.C. 154(b) by 0 days.

(21) Appl. No.: 11/233,374

(22) Filed: Sep. 23, 2005

(65) Prior Publication Data

US 2006/0066949 A1    Mar. 30, 2006

(30) Foreign Application Priority Data

Sep. 24, 2004    (KR) ............. 10-2004-0077465

(51) Int. Cl.
  *G02B 27/10*    (2006.01)
  *G02B 3/00*    (2006.01)
  *B29D 11/00*    (2006.01)

(52) U.S. Cl. .................... 359/619; 264/1.32

(58) Field of Classification Search ........ 359/619–620, 359/625, 626, 628, 455; 264/2.7, 1.32, 1.38, 264/1.7
See application file for complete search history.

(56) References Cited

U.S. PATENT DOCUMENTS 4,952,026 A    8/1990  Bellman et al.
5,252,840 A    10/1993 Shiomi et al.
6,621,637 B2 *  9/2003 Uchiyama et al. .......... 359/619
2003/0136759 A1  7/2003 Mikolas
2005/0002106 A1 *  1/2005 Hasei .................... 359/620

FOREIGN PATENT DOCUMENTS

EP    1 411 376 A1    4/2004
EP    1 602 945 A1    12/2005

* cited by examiner

*Primary Examiner*—Alicia M Harrington
(74) *Attorney, Agent, or Firm*—McKenna Long & Aldridge LLP

(57) ABSTRACT

A microlens array sheet and a manufacturing method thereof. The microlens array sheet comprises: a transparent substrate; bases formed on the transparent substrate, the bases having the same height as a result of a planarization process conducted for the upper portions of the bases, microlenses formed on the bases; and a gap-filling film applied on the resulting structure, in which the bases have the same height. The method comprises the steps of: depositing base-forming molds on a transparent support substrate or film and loading a material to be used as bases between the base-forming molds; polishing the upper portion of the material for use as bases so as to form bases having the same level, and removing the base-forming molds; depositing microlenses on the formed bases; and depositing a gap-filling film on the resulting structure.

9 Claims, 2 Drawing Sheets

Fig. 1 - PRIOR ART
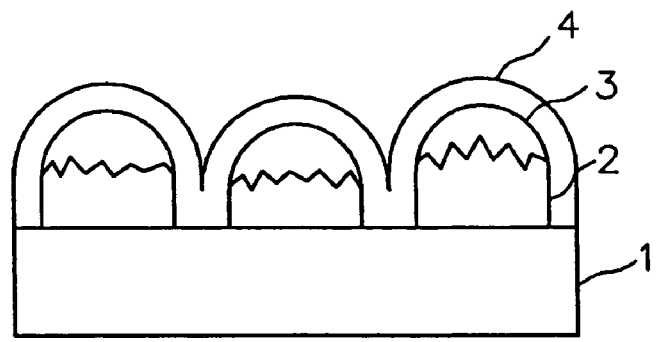
Fig. 2a
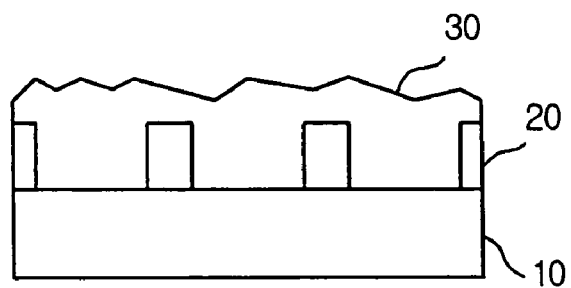
Fig. 2b
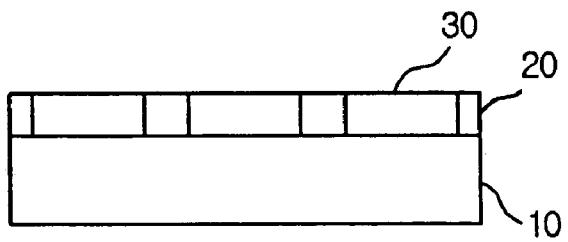
Fig. 2c
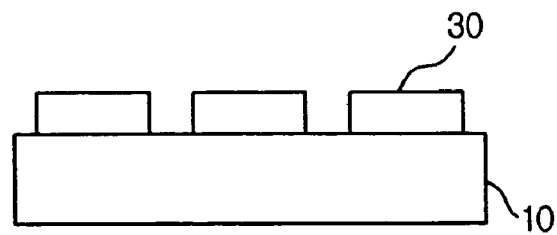

MICROLENS ARRAY SHEET AND MANUFACTURING METHOD THEREOF

This application claims the benefit of Korean Patent Application No. 2004-0077465, filed on Sep. 24, 2004, which is hereby incorporated by reference for all purposes as if fully set forth herein.

BACKGROUND OF THE INVENTION

1. Field of the Invention

The present invention relates to a microlens array sheet having an improved viewing angle and a manufacturing method thereof. More particularly, the present invention relates to a microlens array sheet manufactured by forming microstructures on a transparent substrate or film, subjecting the microstructures to a chemical mechanical polishing (CMP) process, arraying microlenses on the polished microstructures, and forming a gap-filling film on the resulting structure, and a manufacturing method thereof.

2. Description of the Prior Art

At present, microlenses, which are widely used in microoptical systems, are being applied to optical pickup heads, image sensors and the like, and recently, studies to apply the microlenses to various display systems are actively conducted. In more specific examples where the microlenses are applied to the display system, the microlenses are applied in a rear projection screen to enlarge an image projected from a light source and project it onto a screen, and are applied in LCD panels to improve performance for contrast of pixels.

Among the above examples, a microlens array sheet for application to the rear projection screen will now be described in detail. The projection display system is used to enlarge and project an image projected from a light source onto a screen so as to provide the image to viewers, in which the performance of the rear projection screen is determined by various characteristics, such as gain, viewing angle, contrast, resolution and uniformity. Screen uniformity, an essential factor for viewing a high-quality image, is controllable by a manufacturing process.

FIG. 1 is a cross-sectional view of the prior microlens array sheet for application in the rear projection screen. As shown in FIG. 1, a base 3 for embodying light diffusion is formed on a transparent support substrate or film 1, and microlenses 4 are arrayed on the base 3. On the upper surface of the microlenses, a gap-filling film 5 is formed.

The non-uniformities of height and surface roughness of the base become factors deteriorating the optical quality of the microlens array sheet. The non-uniformity of the base height results in a change in the optical properties of an individual microlens. When a microlens array sheet having this base with non-uniform height is used in a rear projection screen, it will influence the shape and density of black matrices, and when it is used in an optical sheet of an image sensor, it will deteriorate the accuracy of the sensor. Also, the non-uniformity of surface roughness of the base influences microlenses formed on the base, thus making it difficult to manufacture a high-quality screen or image sensor.

As described above, the non-uniformity of the base height or surface roughness, which occurs during the manufacturing of the microlens array sheet, acts as a factor deteriorating the optical performance of the microlens array sheet. Particularly in the case of the rear projection screen, when the height of the base becomes non-uniform, the focal length of an individual microlens will vary, and the shape and density of black matrices formed by self-alignment on microlenses will be influenced.

SUMMARY OF THE INVENTION

Accordingly, the present invention has been made to solve the above problems occurring in the prior art, and an object of the present invention is to provide a microlens array sheet having uniform optical performance resulting from improvements in the non-uniformities of height and surface roughness of a base, which occur during the manufacturing process of the microlens array sheet, as well as a manufacturing method thereof.

Another object of the present invention is to provide a microlens array sheet having a preferred diffusion angle, controllable viewing angle characteristics and improved uniformity, as well as a manufacturing method thereof.

To the above objects, in one aspect, the present invention provides a microlens array sheet comprising: a transparent substrate to be arrayed with microlenses; bases formed on the transparent substrate to a height determined by a user, the bases being formed at the same positions as microlenses to be formed later; microlenses formed on the bases; and a gap-filling film applied on the resulting structure, in which the bases have the same height as a result of a planarization process conducted for the upper portion of the bases.

In another aspect, the present invention provides a method for manufacturing a microlens array sheet, comprising the steps of: (a) depositing base-forming molds having a shape and thickness desired by a user on a transparent support substrate or film and filling a material to be used as bases between the base-forming molds; (b) polishing the upper portion of the material for use as bases so as to form bases with the same level and removing the base-forming molds; (c) depositing microlenses on the formed bases; and (d) depositing a gap-filling film on the resulting structure.

In the present invention, the bases are preferably made of at least one material selected from the group consisting of silicon, glass, transparent metal, and organic polymer.

In the present invention, the planar structure of the bases, according to the microlens array, has a circular shape, an oval shape, a polygonal shape or the like, which preferably resembles the shape of an upper portion of a microlens to be formed on each of the bases.

In the present invention, the gap-filling film is preferably formed by at least one process selected from the group consisting of electroplating, electroless plating, sputtering, subliming deposition, chemical vapor deposition, and spin or spray coating processes.

BRIEF DESCRIPTION OF THE DRAWINGS

FIG. 1 is a cross-sectional view of a microlens array sheet according to the prior art.

FIG. 2a is a cross-sectional view showing the step of filling bases.

FIG. 2b is a cross-sectional view showing the step of planarizing bases.

FIG. 2c is a cross-sectional view showing the step of removing base-forming molds.

DETAILED DESCRIPTION OF THE INVENTION

Figure 2D:
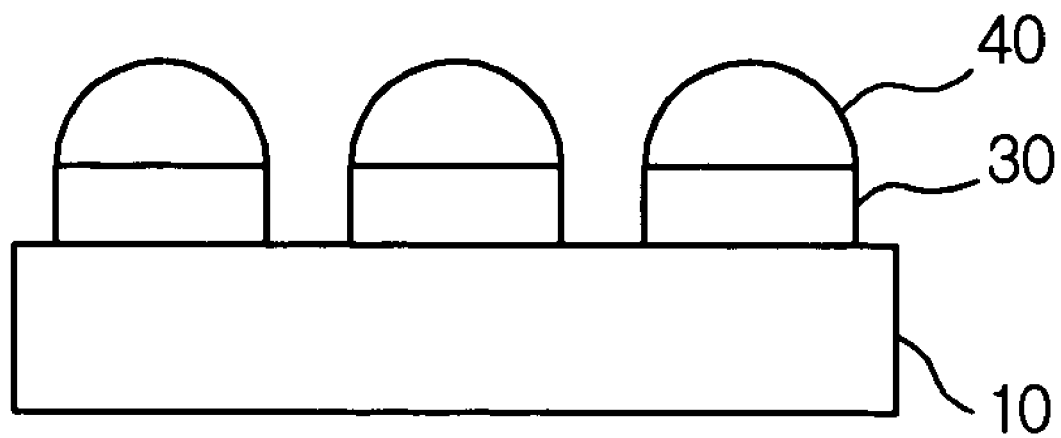
FIG. 2d is a cross-sectional view showing the step of depositing microlenses.

Hereinafter, a preferred embodiment of the present invention will be described with reference the accompanying drawings. In the drawings, like elements are designated by like reference numerals, and the detailed description of known functions and constructions considered to make the subject matter of the present invention unnecessarily ambiguous will be omitted.

FIG. 2a to 2e are cross-sectional views showing a process for manufacturing a microlens array sheet according to one embodiment of the present invention.

A process for manufacturing a microlens array sheet will now be described with reference to FIGS. 2a to 2e.

FIG. 2a shows the step of filling bases 30. As shown in FIG. 2a, base-forming molds 20 with the shape and thickness desired by a user are formed on a transparent support substrate or film 10, and a material to be used as bases is loaded into the gaps between the molds 20. The bases 30 are preferably formed of at least one substance selected from silicon, glass, transparent metal and organic polymer, which are etched selectively with respect to the base-forming molds 20. The planar structure of each of the bases may have a circular shape, an oval shape, a polygonal shape or other shapes, depending on the shape of the base-forming molds 20.

FIG. 2b shows the step of planarizing the bases 30. As shown in FIG. 2b, the material to be used as bases is subjected to chemical mechanical polishing (CMP) to form bases 30 having the desired thickness.

FIG. 2c shows the step of removing the base-forming molds 20, in which the base-forming molds 20 are selectively removed.

FIG. 2d shows the step of depositing microlenses 40, in which the microlenses 40 are formed on the bases 30.

Figure 2E:
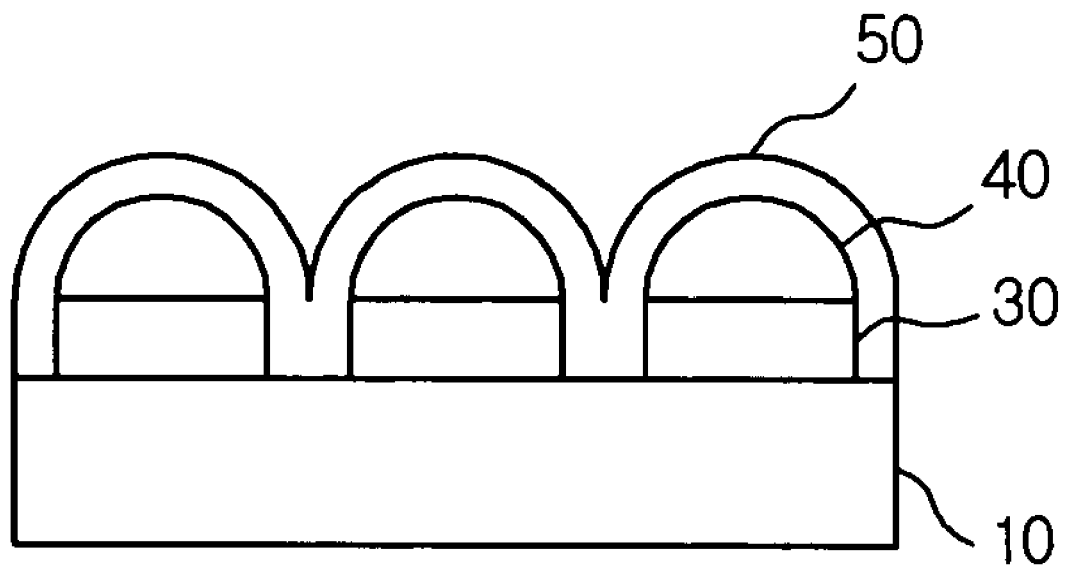
FIG. 2e is a cross-sectional view showing the step of depositing a gap-filling film.

FIG. 2e shows the step of depositing gap-filling film 50, in which the gap-filling film 50 is formed on the microlenses 40, thus manufacturing a microlens array sheet. As shown in FIG. 2e, after the bases 30 are made to have the same height by a CMP process, the microlenses 40 are formed on the respective bases, thus manufacturing a uniform microlens array. Also, the optical performance of the microlens sheet can be controlled by a CMP process.

When the bases 30 have a lower height than the one shown in FIG. 2e, the curvature radius of the upper surface of the gap-filling film 50 will increase, so that the light viewing angle of the resulting array sheet will be narrower than a case designed on the basis of the curvature radius of the microlenses 40. Namely, since the light viewing angle of a microlens array sheet to be formed can be adjusted depending on the height of bases 30, the height of the bases 30 can be determined by carrying out a CMP process according to a light viewing angle desired by a designer.

Meanwhile, the gap-filling film 50 applied according to the present invention can be formed by any general thin film forming process, such as electroplating, electroless plating, sputtering, subliming deposition, chemical vapor deposition, and spin or spray coating processes.

Also, the above-described method for manufacturing the microlens array sheet can be used for mass production and also used to form a master for use in mass production. The microstructure of the microlens array sheet manufactured using the above method can be used as a mold for the manufacturing of a master. Thus, the use of the microlens array sheet as a master, together with the use of technologies, such as master reproduction and injection, allows large-scale reproduction of the microlens array sheet.

The microlens array sheet manufactured by the above method can be applied to rear projection screens, LCD panels, and image sensors, such as CCD or CMOS imaging devices. Also, it can provide uniform optical quality and its optical performance can be easily controlled, leading to a great improvement in the optical performance of the microlens array sheet.

The microlens array sheet according to the present invention is applied as an optical sheet which is placed to correspond to the pixels of a rear projection screen, a charge coupled device (CCD), or a complementary metal oxide semiconductor (CMOS) imaging device, so as to enhance the sensitivity of the devices and to reduce the interference between the pixels of the devices. Also, the inventive microlens array sheet is applied as an optical sheet for improving the contrast performance of LCD (liquid crystal display) panel pixels, adjusting the diffusion angle of emitted light, or adjusting light gain.

As described above, according to the present invention, a uniform microlens array can be manufactured by additionally conducting a CMP process after the formation of the bases. The inventive microlens array sheet can be used as the screen of a display system requiring high quality, and can also be applied to the optical sheet of various image sensors, leading to a great improvement in the accuracy of the sensors.

Also, the present invention provides technology capable of adjusting the height of the bases to allow the optical performance of the microlens array sheet to be easily controlled.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of manufacturing a microlens array sheet, comprising the steps of:
    (a) depositing base-forming molds on a transparent support substrate or film and loading a material to be used as bases between the base-forming molds;
    (b) polishing the upper portion of the material for use as bases so as to form bases having the same level, and removing the base-forming molds;
    (c) depositing microlenses on the formed bases; and
    (d) depositing a gap-filling film on the resulting structure.

2. The method of claim 1, wherein the bases contain at least one material selected from silicon, glass, transparent metal, and organic polymer.

3. The method of claim 1, wherein the planar structure of the bases has at least one shape selected from circular, oval and polygonal shapes.

4. The method of claim 1, wherein the microlenses are made of organic material.

5. The method of claim 4, wherein the microlenses additionally contain at least one material selected from metal, oxide, nitride, and organic polymer.

6. The method of claim 1, wherein the microlenses are made of inorganic material.

7. The method of claim 6, wherein the microlenses additionally contain at least one material selected from metal, oxide, nitride, and organic polymer.

8. The method of claim 1, wherein each of the microlenses has a size of less than 1-10 mm.

9. The method of claim 1, wherein the gap-filling film is formed by at least one process selected from electroplating, electroless plating, sputtering, subliming deposition, chemical vapor deposition, and spin or spray coating processes.

* * * * *